United States Patent [19]

Reynolds

[11] 4,208,026
[45] Jun. 17, 1980

[54] AIRPLANE LOCK FOR CONTROL SURFACES

[76] Inventor: Arthur T. Reynolds, 610 Crystal Dr., Pittsburgh, Pa. 15228

[21] Appl. No.: 923,788

[22] Filed: Jul. 12, 1978

[51] Int. Cl.² .............................................. B64C 13/14
[52] U.S. Cl. ..................................... 244/224; 70/212; 70/200; 74/495
[58] Field of Search ................ 244/83 R, 83 A, 1 R; 70/211, 212, 199, 200, 30, 49; 74/495; 180/82 R; 280/296

[56] References Cited

U.S. PATENT DOCUMENTS

| | | | |
|---|---|---|---|
| 1,193,652 | 8/1916 | Wind | 70/200 |
| 1,361,264 | 12/1920 | Kaercher | 70/212 |
| 1,383,659 | 7/1921 | Perkins | 70/200 |
| 3,330,504 | 7/1967 | Lewis | 244/83 A |
| 3,833,190 | 9/1974 | Gaio | 244/83 A |

FOREIGN PATENT DOCUMENTS 656027 4/1929 France .......................................... 70/200

Primary Examiner—Galen L. Barefoot
Attorney, Agent, or Firm—William J. Ruano

[57] ABSTRACT

Means for inter-locking the two control wheels of an airplane to prevent movement or vibration of the ailerons and horizontal stabilizer when the plane is parked. Such means is in the form of a loop of cord which is looped snugly about each inboard upright arm of the two control wheels to prevent movement of the ailerons. An integral straight cord portion pulls the control wheels rearwardly sufficiently so as to raise the horizontal stabilizer and prevent it also from moving. The straight cord is anchored on the floor of the aircraft between the seats of the pilot and co-pilot.

1 Claim, 1 Drawing Figure

U.S. Patent
Jun. 17, 1980
4,208,026
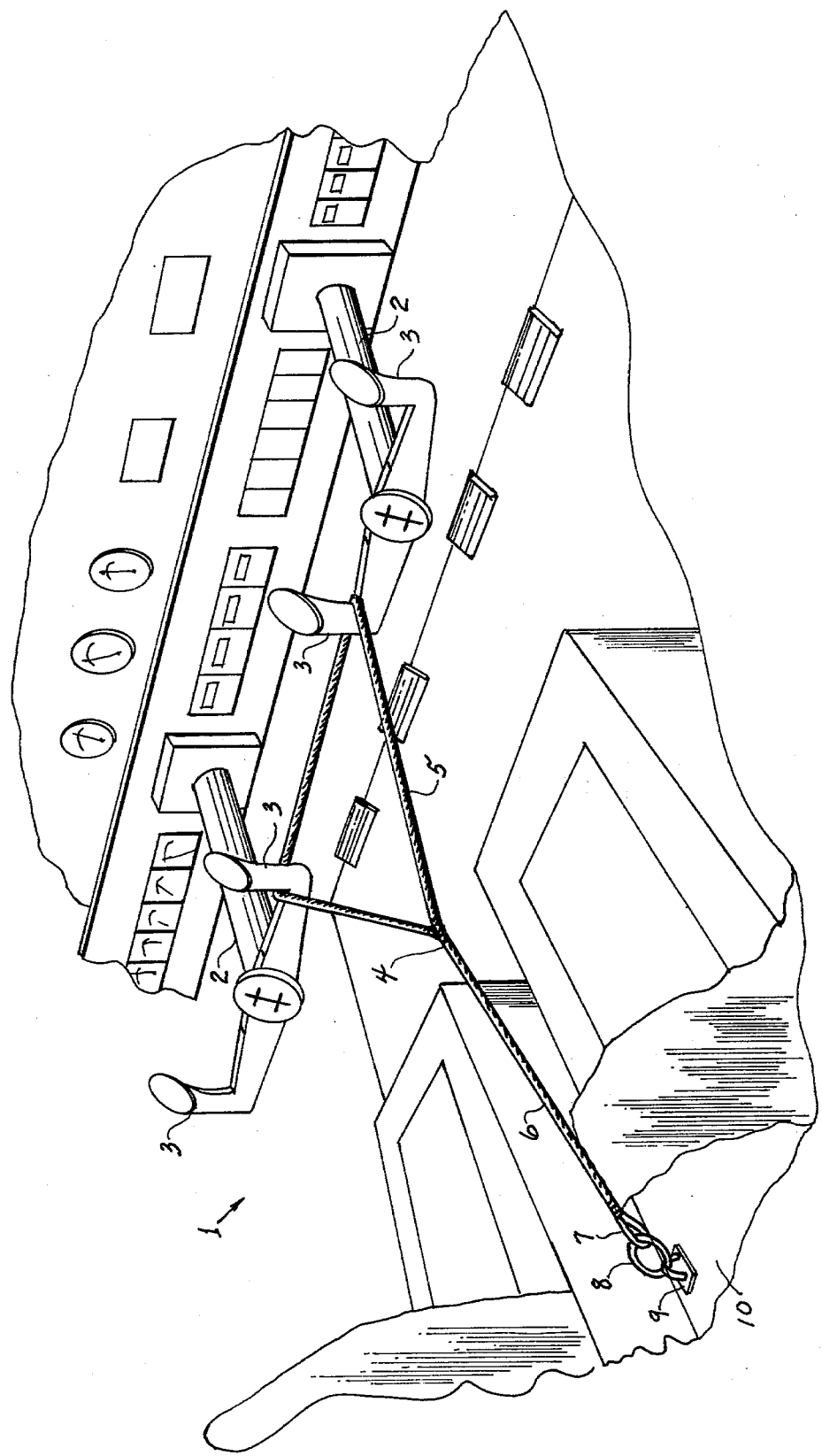

AIRPLANE LOCK FOR CONTROL SURFACES

My invention relates to an aircraft control system and, more particularly, to means for securing locking the ailerons and the horizontal stabilizer from movement or vibration caused by wind, jet blast, prop wash, and the like.

In the past, attempts have been made to restrict the above-mentioned movements since they can be very damaging to the aircraft if violent or persisting for a long period of time. Attempts have been made to prevent such movements by outside restraining devices attached to the control surfaces, such as the ailerons. However, this has not been at all satisfactory since such outside restraining devices may be easily forgotten at the time of take-off and could be fatal to the pilot and aircraft.

Other attempts have been made by providing locking devices that can be actuated from the inside of the cockpit. However, these likewise are not satisfactory since they tend to be complicated since they are built in and constitute just additional pieces of equipment that must be serviced and checked regularly.

The object of my invention is to provide a relatively simple, inexpensive and readily visible locking means for the control wheel of an aircraft, which means is easily and quickly attachable to the control wheels and which secures such wheels from rotating movement and horizontal movements.

Other objects and advantages of the invention will become more apparent from a study of the following description taken with the accompanying drawing, wherein the single FIGURE is a top perspective view of a fragmentary portion of the cockpit and controls or control wheels of an aircraft equipped with securing means embodying the present invention.

Referring more particularly to the single FIGURE, numeral 1 generally denotes the cockpit area wherein the control wheels are mounted on the dashboard or control panel of the airplane. Each of the control wheels comprises a pair of upright arms 3,3 of conventional construction for controlling the movement of the outer control surfaces, such as the ailerons. Integrally secured to each control wheel is a horizontal shaft 2 which may be pushed inwardly and outwardly through the instrument panel to control the movement of the horizontal stabilizer.

In accordance with the present invention, a loop of cord 5 of nylon, rope or other flexible cord material is looped about one of the inboard upright arms (3) of each of the control wheels to interlock the control wheels and prevent both from rotational movement, therby securing the ailerons against movement when the aircraft is at rest, such movement being due to wind, jet blast and "propwash". To the loop 5 there is integrally secured, at 4, a straight piece of rope 6 which terminates in a loop or any well known fastening element 7 detachably secured to a ring 8 which is hooked onto a bracket 9 on the floor portion or other stationary portion 10 of the aircraft in a position between the pilot and co-pilot seats.

By tightly pulling the cord 6 rearwardly of the aircraft to move shafts 2 rearwardly sufficiently to raise the horizontal stabilizer and anchoring the loop and straightforward assembly in such position, it will be seen that a dual function is accomplished thereby. The loop 5 prevents either of the control wheels from being moved in the plane of the upright arms 3, —also it holds the control wheels in a rearward position relative to the instrument panel and therby insures that the horizontal stabilizer will be raised and prevent it from further movement.

The loop 5 and straight portion 6 are preferably made of brightly colored rope or nylon so that they may be readily visible to the pilot or co-pilot before the aircraft is made ready for flight. By simply unfastening element 7 and removing the loop 5 from the adjacent arms 3,3, both the ailerons and horizontal stabilizer are released so as to be freely controlable by the control wheels 3—3. Of course the expense of the locking system shown is minimal compared to conventional locks and yet safer, as well as requiring no maintenance.

Thus it will be seen that I have provided an efficient simple and highly inexpensive means for locking the control wheels of an aircraft against movement either in the plane of the upright arms thereof or in a right angular plane, horizontally of the aircraft, to provide a dual locking function, including both the ailerons and the horizontal stabilizer so as to prevent damaging movements of the control surfaces from vibrations resulting from winds, jet blast and "prop wash".

While I have illustrated and described a single specific embodiment of my invention, it will be understood that this is by way of illustration only and that various changes and modifications may be contemplated in my invention and within the scope of the following claims.

I claim:

1. In an aircraft having a pair of control wheels, side by side, each having two vertically upwardly extending control arms to enable the pilot and co-pilot to control the movements of the ailerons and horizontal stabilizer, wherein the improvement comprises a loop of flexible, non metallic cord looped snugly about the adjacent vertically upwardly extending control arms of both control wheels, and means anchored rearwardly and centrally between said control wheels comprising a piece of cord attached to said loop and fastened at the other end rearwardly of the aircraft floor between the seating positions of the pilot and co-pilot for pulling said loop sufficiently tightly rearwardly so as to raise the horizontal stabilizer and prevent it from moving, whereby movements of both the ailerons and horizontal stabilzer are yieldably arrested.

* * * * *